(12) United States Patent
Joshi et al.

(10) Patent No.: US 8,707,282 B2
(45) Date of Patent: Apr. 22, 2014

(54) META-DATA BASED DATA PREFETCHING

(75) Inventors: Shrinivas B. Joshi, Austin, TX (US);
Thomas M. Deneau, Austin, TX (US)

(73) Assignee: Advanced Micro Devices, Inc.,
Sunnyvale, CA (US)

( * ) Notice: Subject to any disclaimer, the term of this patent is extended or adjusted under 35 U.S.C. 154(b) by 794 days.

(21) Appl. No.: 12/637,022

(22) Filed: Dec. 14, 2009

(65) Prior Publication Data
US 2011/0145502 A1 Jun. 16, 2011

(51) Int. Cl.
*G06F 9/45* (2006.01)

(52) U.S. Cl.
USPC .......................................... 717/152

(58) Field of Classification Search
CPC ............ G06F 12/0862; G06F 12/0811; G06F 12/0897
USPC .......................................... 717/152
See application file for complete search history.

(56) References Cited

U.S. PATENT DOCUMENTS

| | | | |
|---|---|---|---|
| 5,367,685 A | 11/1994 | Gosling | |
| 7,337,271 B2 * | 2/2008 | Emma et al. | 711/117 |
| 7,620,777 B2 * | 11/2009 | Dimpsey et al. | 711/137 |
| 8,225,045 B2 * | 7/2012 | Guthrie et al. | 711/122 |
| 8,271,942 B2 * | 9/2012 | Nigul et al. | 717/108 |
| 2002/0144240 A1 | 10/2002 | Lueh et al. | 717/136 |
| 2003/0120868 A1 * | 6/2003 | Royer et al. | 711/133 |
| 2005/0210198 A1 * | 9/2005 | Dimpsey et al. | 711/137 |
| 2006/0080401 A1 * | 4/2006 | Gill et al. | 709/217 |
| 2006/0179240 A1 * | 8/2006 | Chatterjee et al. | 711/138 |
| 2007/0186050 A1 * | 8/2007 | Luick | 711/137 |
| 2008/0177754 A1 * | 7/2008 | Gill et al. | 707/10 |
| 2008/0301375 A1 * | 12/2008 | Donawa et al. | 711/137 |
| 2009/0217013 A1 * | 8/2009 | Caprioli | 712/228 |
| 2009/0254883 A1 * | 10/2009 | Munson et al. | 717/124 |

OTHER PUBLICATIONS

Jain et al. "Controlling Cache Pollution in Prefetching With Software-assisted Cache Replacement", Jul. 2001, MIT.*
Chen et al. "Eviction Based Cache Placement for Storage Caches", Jun. 2003, USENIX Association.*
Soares et al. "Reducing the Harmful Effects of Last-Level Cache Polluters with an OS-Level, Software-Only Pollute Buffer", Nov. 2008, IEEE/ACM.*
Drongowski, Paul J., "Instruction-Based Sampling: A New Performance Analysis Technique for AMD Family 10h Processors," Nov. 19, 2007, 14 pages, http://developer.amd.com/assets/AMD_IBS_paper_EN.pdf.
Drongowski, Paul J., "Basic Performance Measurements for AMD Athlon™ 64, MAD Opteron™ and AMD Phenom™ Processors," Sep. 25, 2008, 26 pages, http://developer.amd.com/Assets/Basic_Performance_Measurements.pdf.

* cited by examiner

*Primary Examiner* — Wei Zhen
*Assistant Examiner* — Junchun Wu
(74) *Attorney, Agent, or Firm* — Abel Law Group, LLP

(57) ABSTRACT

A technique for prefetching data into a cache memory system includes prefetching data based on meta information indicative of data access patterns. A method includes tagging data of a program with meta information indicative of data access patterns. The method includes prefetching the data from main memory at least partially based on the meta information, by a processor executing the program. In at least one embodiment, the method includes generating an executable at least partially based on the meta information. The executable includes at least one instruction to prefetch the data. In at least one embodiment, the method includes inserting one or more instructions for prefetching the data into an intermediate form of program code while translating program source code into the intermediate form of program code.

21 Claims, 2 Drawing Sheets

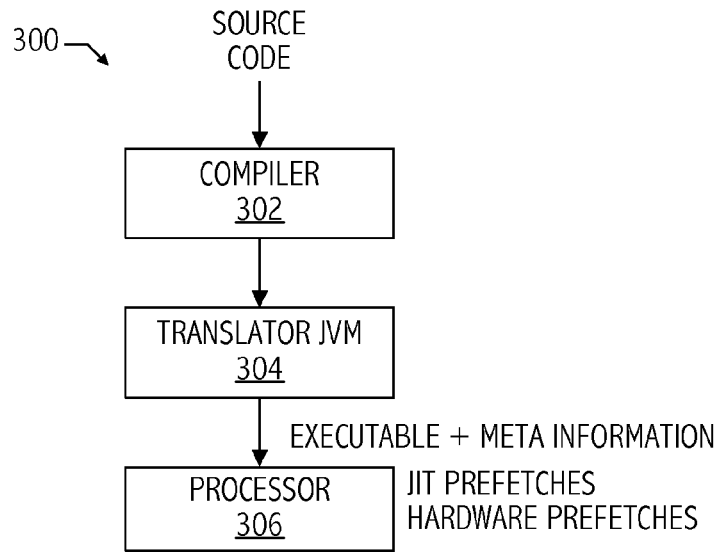
FIG. 3
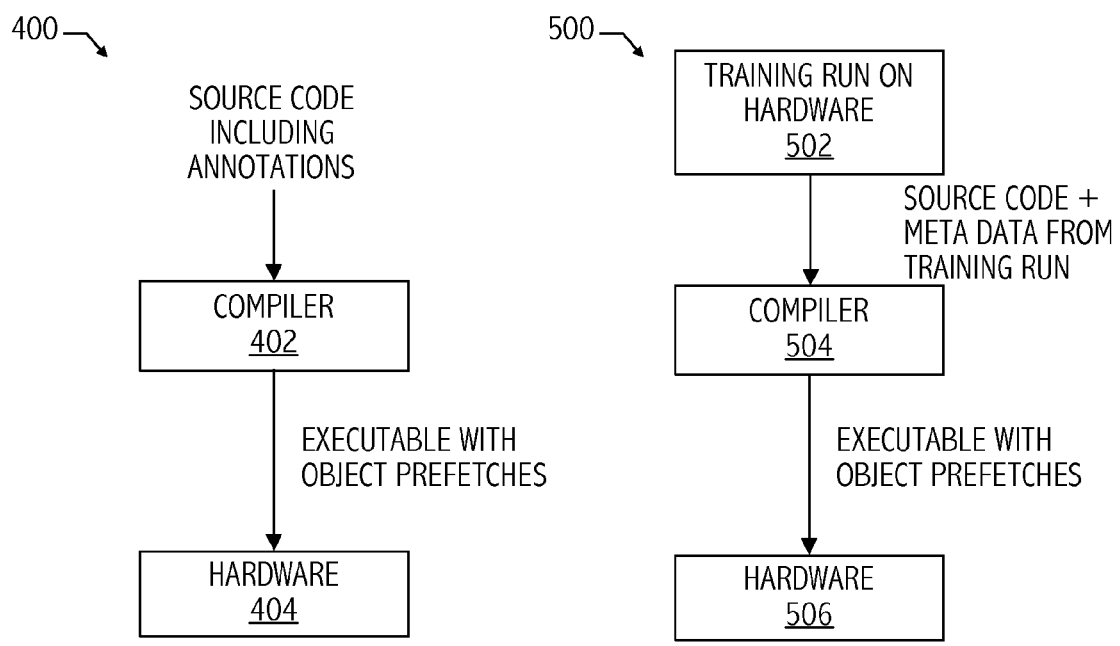
FIG. 4
FIG. 5

META-DATA BASED DATA PREFETCHING

BACKGROUND

1. Field of the Invention

This invention relates to computing systems and more particularly to data prefetching of computing systems.

2. Description of the Related Art

Referring to FIG. 1, a typical hierarchical memory system (e.g., memory system 10) includes a cache (e.g., cache 13), a main memory (e.g., main memory 20), a cache control circuit (e.g., cache controller 22), and one or more execution units and/or one or more processors (e.g., processor 12). The execution unit or processor, cache control circuit, and cache may reside on one or more integrated circuits. Cache 13 may be a multi-level cache (e.g., a three-level cache, as shown in FIG. 1). In general, the storage capacity of individual levels of a multi-level cache increases with increasing cache level while the cost and speed decrease with increasing cache level. The term "cache," as used hereinafter, refers to at least one level of a cache (e.g., level-1 of a three-level cache), unless otherwise specified. Cache controller 22 is a circuit, subcircuit, or other device that controls the state of a corresponding cache. Although cache controller 22 is illustrated as being separate from processor 12, cache 13, and main memory 20, a cache control circuit may be included, for example, as part of a cache, execution unit or processor, or other portion of a system including a cache.

Due to a limited, although large, cache size, only a portion of the data available to the execution unit or processor can reside in the cache at a particular time. When the processor attempts to access a specific location in main memory, the processor first determines whether or not the contents of a particular memory location are present in the cache. If the contents of the particular location in main memory are present in the cache, a "cache hit" occurs and the processor fetches the contents of the particular location in memory from the cache. If the contents of the particular location in main memory are not present in the cache, a "cache miss" occurs and the processor fetches the contents from main memory.

SUMMARY OF EMBODIMENTS OF THE INVENTION

A technique for prefetching data into a cache memory system includes prefetching data based on meta information indicative of data access patterns. In at least one embodiment of the invention, a method includes tagging data of a program with meta information indicative of data access patterns. The method includes prefetching the data from main memory at least partially based on the meta information, by a processor executing the program. In at least one embodiment of the invention, the method includes generating an executable at least partially based on the meta information. The executable includes at least one instruction to prefetch the data. In at least one embodiment of the invention, the method includes inserting one or more instructions for prefetching the data into an intermediate form of program code while translating program source code into the intermediate form of program code.

In at least one embodiment of the invention, an apparatus includes a translator configured to generate an executable from intermediate instructions based on source code. The translator software is further configured to insert into the executable at least one prefetch of data from main memory based on meta information associated with the data and indicative of a type of prefetch operation. The translator is a computer program product encoded in at least one computer readable medium selected from the set of a disk, tape, or other magnetic, optical, or electronic storage medium.

In at least one embodiment of the invention, an apparatus includes a compiler configured to transform source code into a target language and tag data in the target language with meta information indicative of a data access pattern. In at least one embodiment of the invention, the apparatus includes a hardware prefetcher configured to prefetch data from main memory according to the meta information. The compiler is a computer program product encoded in at least one computer readable medium selected from the set of a disk, tape, or other magnetic, optical, or electronic storage medium.

In at least one embodiment of the invention, a hardware prefetcher is configured to prefetch data from main memory according to meta information indicative of a data access pattern. The meta information may indicate a temporal or non-temporal data access pattern

BRIEF DESCRIPTION OF THE DRAWINGS

The present invention may be better understood, and its numerous objects, features, and advantages made apparent to those skilled in the art by referencing the accompanying drawings.

FIG. 3 illustrates exemplary information and control flows for meta-data based data prefetching techniques consistent with at least one embodiment of the invention.

FIG. 4 illustrates exemplary information and control flows for meta-data based data prefetching techniques for source code including annotations consistent with at least one embodiment of the invention.

FIG. 5 illustrates exemplary information and control flows for meta-data based data prefetching techniques generating meta data from a software training run consistent with at least one embodiment of the invention.

The use of the same reference symbols in different drawings indicates similar or identical items.

DETAILED DESCRIPTION

Figure 1:
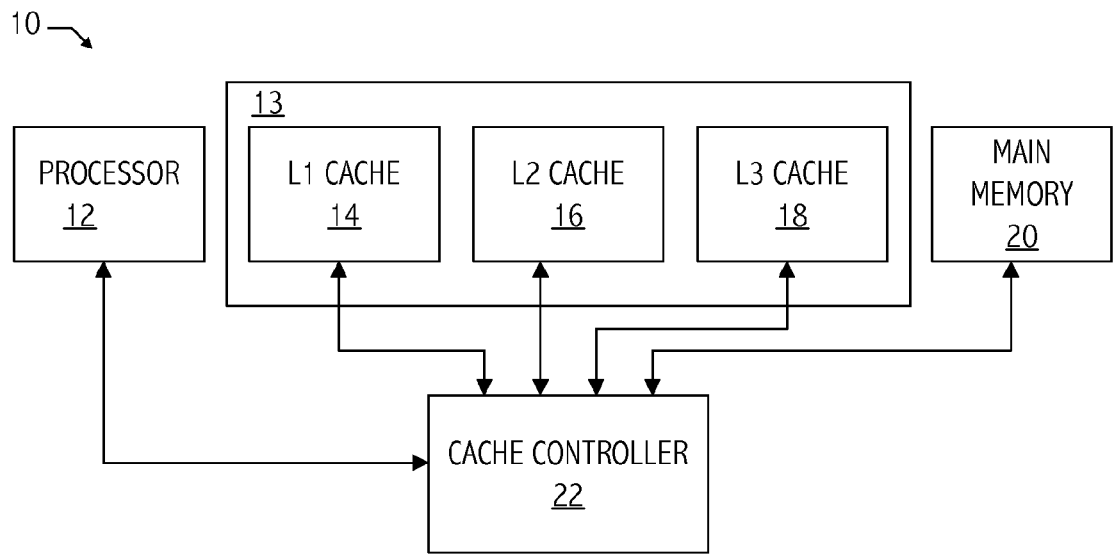
FIG. 1 illustrates a block diagram of an exemplary hierarchical memory system.

Referring to FIG. 1, in general, data prefetching, i.e., fetching data from main memory before the data is needed by the processor, improves performance of an application executing on processor 12 by reducing load-to-use latency of memory accesses. Data prefetching substantially improves performance of data-intensive applications in particular. Accessing data from cache 13 is substantially faster than accessing the data from main memory 20. For example, processor 12 may use hundreds of clock cycles to access data from main memory 20 and may use only a few clock cycles to access data from cache 13. An exemplary processor 12 implements data prefetching by supporting data prefetch instructions and/or hardware level data prefetching.

A typical hardware prefetcher prefetches data into the processor cache based on cache behavior, data access patterns, and software-triggered prefetches. In general, the hardware prefetcher is influenced by data access patterns. However, the hardware prefetcher has limited ability to make prefetch decisions based on those data access patterns. For example, the data access pattern information received by the hardware prefetcher does not include meta information (e.g., whether the data is not going to be used for sufficiently long time indicating that the hardware prefetcher should prefetch the data non-temporally and vice versa). The prefetched data may be accessed by an application executing on the processor during subsequent clock cycles. Prefetch operations (e.g., hardware or software prefetches) may have a temporal or non-temporal type. Since recently accessed data are likely to be needed again in the near future, the data is placed in the cache where it can be accessed quickly. A temporal prefetch prefetches data to a low-level cache (e.g., level-1 cache 14) and the data is later evicted to a higher-level cache (e.g., level-2 cache 16). A non-temporal prefetch prefetches data into level-1 of the cache, without evicting data to level-2 cache 16 or other levels of cache 13 unless the data access resulted in a hit in a higher-level cache. Non-temporal prefetches reduce cache pollution, i.e., situations where an executing application loads data into a level of the cache unnecessarily. Cache pollution causes other data needed by the processor to be evicted from a cache level into higher-levels of the memory hierarchy, potentially all the way up to main memory, thereby impacting performance. Thus, non-temporal prefetches are useful when prefetched data is not likely to be accessed again by the processor soon after its initial use.

In general, a JAVA Virtual Machine (JVM) is one or more computer software programs and data structures that use a virtual machine model for the execution of other computer programs and scripts. As referred to herein, an "object" is a dynamically created instance of a class, which is a fundamental data type used to implement an abstract data structure in an object-oriented programming language. The virtual machine model accepts a computer intermediate language known as JAVA bytecode. An exemplary JVM prefetches objects from memory but uses prefetches only during an object allocation phase. For example, the JVM prefetches memory locations from a configurable distance ahead of a current allocation pointer. By the time the allocation pointer reaches the previously prefetched memory location, the contents of that memory location are already in the cache. In at least one embodiment of a JVM, all objects are allocated in a single heap and thus, are prefetched by the same type of prefetch. However, in other embodiments, particular prefetch types may be associated with particular object or class types. In at least one embodiment of a JVM, a non-temporal prefetch is the default type of object since, in general, most objects allocated are short-lived and non-temporal prefetches will not degrade performance from pollution of the higher-level caches.

An exemplary JVM does not generate software prefetches after the object allocation phase, but rather relies on hardware-generated prefetches outside the object allocation phase. For example, in response to a cache miss, hardware external to the cache (e.g., a cache controller or a processor) fetches contents of multiple memory locations, which include contents of a requested memory location and contents of a next consecutive memory location. The contents of the requested memory location are placed in the cache and the prefetched contents are placed into the cache or into a prefetch buffer or storage location that can be more quickly accessed than main memory.

An exemplary hardware prefetcher generates temporal prefetches unless the hardware prefetcher is triggered by a non-temporal software prefetch. That process of deciding a type of prefetch by the hardware prefetcher can result in sub-optimal cache utilization and degrade application performance. Accordingly, a technique for making intelligent decisions about a type of prefetch operation being executed by an application executing on a processor improves efficiency of processor cache utilization, thereby improving application performance. Embodiments of the technique for making intelligent decisions include static techniques and dynamic techniques to make those decisions and include hardware and/or software implementations.

Figure 2:
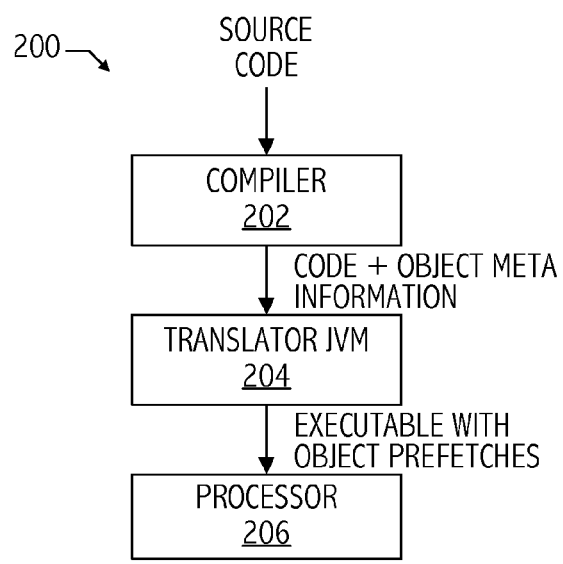
FIG. 2 illustrates exemplary information and control flows for meta-data based data prefetching techniques consistent with at least one embodiment of the invention.

Referring to FIG. 2, in at least one embodiment of a static meta-data based data prefetching technique, source code for applications developed for processor 12 are written in a high-level programming language (e.g., JAVA programming language). A compiler, which includes one or more computer programs, converts the source code from the high-level programming language to a lower-level language (202). The lower-level language may be machine-specific code (e.g., assembly language) or an intermediate form of code (e.g., JAVA bytecode or other bytecode). In at least one embodiment of the meta-data based data prefetching technique, the high-level programming language can be any suitable computer language (e.g., JAVA, C, Pascal, Ada, etc.).

The compiler tags data of the source code (e.g., objects or other suitable data structures) with meta information indicative of data accesses. For example, in the JAVA computer language, meta information (i.e., metainformation, meta data, meta-data, or metadata) may be stored in an annotation. An annotation is a special form of syntactic meta information that can be added to JAVA source code that indicates how data should be handled by development tools, deployment tools, or run-time libraries). Classes, methods, variables, parameters and packages may be annotated. JAVA annotations can be embedded in a class file generated by the compiler and may be retained by the JVM to be accessible at run-time. In at least one embodiment of a meta-data based data prefetching technique, JAVA annotations or other suitable JVM-provided feature are used to tag JAVA objects at compile-time. Still referring to FIG. 2, a translator (e.g., a JAVA Virtual Machine (JVM), other virtual machine, dynamic translator, or just-in-time compiler) translates the intermediate form of code into executable machine code (204). Although FIG. 2 illustrates a JVM, other translators may be used, e.g., the P-Code virtual machine of UCSD Pascal or other suitable translator.

Referring to FIG. 3, in at least one embodiment of a meta-data based data prefetching technique, the translation is dynamically performed by the JVM, i.e., the JVM converts JAVA bytecode code at runtime prior to executing the code natively, just-in-time (JIT) for high-speed code execution. For example, a JVM translates bytecode into native machine code of processor 12. The JVM caches results of translating blocks of code, not simply reevaluating each line or operand each time it is met. The JVM, which is the instance of the JRE (JAVA Runtime Environment), comes into action when a JAVA program is executed. In at least one embodiment of the intelligent data technique, the native machine code is made available to a processor (e.g., processor 12 of FIG. 1), e.g., by storing the executable in a memory (e.g., main memory 20) accessible by the processor (306).

In at least one embodiment of a dynamic meta-data based data prefetching technique, a JVM itself tags data (e.g., objects or other suitable data structures) with meta information indicative of data access patterns. The JVM may use that meta information to determine a type of software prefetch operation. Subsequent hardware prefetch decisions are influenced by JVM software prefetches. For example, the JVM identifies that certain objects are always missed at all levels of the cache. The access pattern of such objects indicates that between any two accesses a substantial amount of other data is accessed, which forces the eviction of these objects from all levels of the cache. Accordingly, the JVM tags these objects with meta information indicating that software and hardware prefetches of these objects should have a non-temporal type.

In at least one embodiment of a dynamic meta-data based data prefetching technique, a hardware prefetcher is used. Meta information is collected by any suitable technique and stored in a medium accessible to the hardware prefetcher. The hardware prefetcher accesses that meta information and determines an appropriate prefetch operation.

In addition, the JVM can identify when particular objects are reused soon after they are evicted from the cache. Generating non-temporal prefetches for those objects results in those objects being accessed from main memory rather than from the cache even though those objects were recently accessed from the cache. To improve performance, the JVM tags those objects with meta information indicating that all software and hardware prefetches of those objects, including those at object allocation time, should be temporal prefetches.

In at least one embodiment of the meta-data based data prefetching technique, a JVM uses run-time profile information to identify different types of data access patterns, which may be used to generate meta information. In at least one embodiment, an meta-data based data prefetching technique, a JVM may change an existing prefetch of an object from one type to another. For example, the JVM may change a temporal prefetch of the object to a non-temporal prefetch based on a substantial amount of time between two successive accesses of that object. Likewise, the JVM may change a non-temporal prefetch of an object to a temporal prefetch of the object to evict the object to a lower-level cache due to a small amount of time between two successive accesses of that object. In at least one embodiment of the meta-data based data prefetching technique, a JVM gathers profile information during a training run of a particular application.

In at least one embodiment, a JVM determines data prefetch type dynamically according to meta information associated with the data. The processor may sample instructions and provide information to the JVM indicative of access patterns. For example, instruction-based sampling may be used. Application developers may use any suitable performance analysis technique, e.g., timer-based measurements, event-based performance measurements, Instruction-Based Sampling introduced by Advanced Micro Devices, Inc. Family10h processors, or other suitable processor supported mechanisms. Event-based performance measurements use hardware resources of a processor (e.g., performance counters) to measure hardware events (e.g., memory accesses, data cache request rate, data cache miss rate, etc.) caused by application programs and system software.

Referring to FIG. 4, in at least one embodiment of an meta-data based data prefetching technique, a compiler converts the source code, which includes annotations, from a high-level programming language directly to an executable (402). The compiler uses the annotations in the source code to produce meta information. The compiler tags data with meta information indicative of data accesses. A hardware prefetcher inserts into instruction execution temporal and/or non-temporal prefetches according to that meta information (404).

Referring to FIG. 5, in at least one embodiment of an meta-data based data prefetching technique, a version of software without data prefetches executes on hardware during a software training run (502). During the software training run, meta information indicative of data accesses is generated using any suitable technique. The meta information from the training run is then provided to a compiler along with the source code. The compiler converts the source code, from a high-level programming language directly to an executable and tags data with the meta information (504). The hardware prefetcher inserts into instruction execution temporal and/or non-temporal prefetches according to that meta information (506).

In at least one embodiment of the meta-data based data prefetching technique, software described herein (e.g., compilers and/or translators) is embodied in one or more computer-readable media. A computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. For example, although the invention has been described in an embodiment in which objects are used, one of skill in the art will appreciate that the teachings herein can be utilized with other data structures. In addition, while the invention has been described in an embodiment in which the JAVA programming language and JRE are used, one of skill in the art will appreciate that the teachings herein can be utilized with other programming languages and computing platforms. Variations and modifications of the embodiments disclosed herein, may be made based on the description set forth herein, without departing from the scope and spirit of the invention as set forth in the following claims.

What is claimed is:

1. A method comprising:
   tagging data of a program with meta information indicative of a data access pattern; and
   prefetching the data from main memory, by a processor executing the program, the prefetching being a non-temporal prefetch in response to the meta information indicating the data access pattern is non-temporal, the prefetching being a temporal prefetch in response to the meta information indicating the data access pattern is temporal,
   wherein the non-temporal prefetch prefetches the data into a first level of a cache and the data is not evicted into a higher-level cache unless the data access results in a hit in the higher-level cache, and wherein the temporal prefetch prefetches data into a first level of a cache and the data is later evicted into a higher-level cache.

2. The method, as recited in claim 1, wherein the data includes an object of an object-oriented program and the data access pattern is an object access pattern.

3. The method, as recited in claim 1, further comprising:
   generating an executable at least partially based on the meta information, wherein the executable includes at least one instruction to prefetch the data.

4. The method, as recited in claim 3, further comprising:
   inserting one or more instructions for prefetching the data into an intermediate form of program code while translating program source code into the intermediate form of program code.

5. The method, as recited in claim 4, wherein the intermediate form is bytecode and a compiler inserts the one or more instructions for prefetching the data into an intermediate form of program code.

6. The method, as recited in claim 1, further comprising:
   translating program source code into an intermediate form of program code; and
   inserting one or more instructions for prefetching the data into platform-specific program code while translating the intermediate form of program code into platform-specific program code.

7. The method, as recited in claim 6, wherein the intermediate form is bytecode and a virtual machine inserts the one or more prefetch instructions.

8. The method, as recited in claim 1, further comprising:
collecting information indicative of the data access pattern during execution of training code.

9. The method, as recited in claim 1, further comprising: changing a prefetch of the data from one of a temporal prefetch type and a non-temporal prefetch type to the other of the temporal prefetch type and the non-temporal prefetch type based on the meta information.

10. The method, as recited in claim 1, wherein the prefetching is the non-temporal prefetch and the data access pattern indicates that between any two accesses of the data a substantial amount of other data is accessed.

11. The method, as recited in claim 1, wherein the prefetching is the temporal prefetch and the data access pattern indicates that the data is likely to be used again soon.

12. An apparatus comprising: a translator configured to generate an executable from intermediate instructions based on source code, wherein the translator is further configured to insert into the executable at least one prefetch of data from main memory, the prefetch being a non-temporal prefetch in response to meta information indicating a non-temporal data access pattern, the prefetch being a temporal prefetch in response to meta information indicating a temporal data access pattern, and wherein the translator is a computer program product encoded in at least one computer readable medium selected from the set of a disk, tape, or other magnetic, optical, or electronic storage medium,
wherein the non-temporal prefetch prefetches data into a first level of a cache and the data is not evicted into a higher-level cache unless the data access results in a hit in the higher-level cache,
and wherein the temporal prefetch type prefetches data into a first level of a cache and the data is later evicted into a higher-level cache.

13. The apparatus, as recited in claim 12, wherein the translator is configured to change a prefetch of the data from one of a temporal prefetch type and a non-temporal prefetch type to the other of the temporal prefetch type and the non-temporal prefetch type based on the meta information.

14. The apparatus, as recited in claim 12, wherein the translator is configured to identify temporal information associated with the data and tag the data with meta information accordingly.

15. The apparatus, as recited in claim 12, wherein the translator is configured to generate the meta information based on executing of an executable based on the source code.

16. The apparatus, as recited in claim 12, wherein the translator is configured to generate the meta information based on hardware-based performance measurements.

17. The apparatus, as recited in claim 12, wherein the intermediate instructions are bytecode and the translator is a virtual machine.

18. The apparatus, as recited in claim 12, further comprising:
a hardware prefetcher configured to prefetch the data.

19. An apparatus comprising: a hardware prefetcher configured to prefetch data from main memory according to meta information indicative of a data access pattern, the prefetch being a non-temporal prefetch in response to the meta information indicating that the data access pattern is non-temporal, the prefetch being a temporal prefetch in response to the meta information indicating that the data access pattern is temporal,
wherein the non-temporal prefetch prefetches data into a first level of a cache and the data is not evicted into a higher-level cache unless the data access results in a hit in the higher-level cache, and wherein the temporal prefetch prefetches data into a first level of a cache and the data is later evicted into a higher-level cache.

20. The apparatus, as recited in claim 19, further comprising
a compiler configured to transform source code into a target language and further configured to tag the data in the target language with the meta information indicative of the data access pattern,
wherein the compiler is a computer program product encoded in at least one computer readable medium selected from the set of a disk, tape, or other magnetic, optical, or electronic storage medium.

21. The apparatus, as recited in claim 20, wherein the target language is an intermediate language.

* * * * *